United States Patent [19]

Riggs et al.

[11] Patent Number: 5,359,288

[45] Date of Patent: Oct. 25, 1994

[54] POSITION DETECTING APPARATUS USING VARIABLE MAGNETIC FIELD INTENSITY

[75] Inventors: William D. Riggs, Southington; Hermann Rosshirt, Bristol, both of Conn.

[73] Assignee: North American Philips Corporation, New York, N.Y.

[21] Appl. No.: 161,042

[22] Filed: Dec. 1, 1993

Related U.S. Application Data

[63] Continuation of Ser. No. 842,829, Feb. 27, 1992, abandoned.

[51] Int. Cl.$^5$ ............................................. G01B 7/14
[52] U.S. Cl. ........................ 324/207.22; 324/207.2; 280/707; 280/DIG. 1
[58] Field of Search ............ 324/207.2, 207.22, 207.25, 324/174; 280/6.1, 707, DIG. 1

[56] References Cited

U.S. PATENT DOCUMENTS

| | | | |
|---|---|---|---|
| 3,473,109 | 10/1969 | Maaz et al. | |
| 3,838,263 | 9/1974 | Haeusler et al. | |
| 4,107,604 | 8/1978 | Bernier | |
| 4,204,158 | 5/1980 | Ricouard et al. | |
| 4,319,236 | 3/1982 | Brace et al. | 324/207.2 X |
| 4,471,304 | 9/1984 | Wolf | 324/207.2 |
| 4,555,120 | 11/1985 | Frait et al. | 324/207.2 X |
| 4,810,965 | 3/1989 | Fujiwara et al. | 324/207.24 X |
| 4,822,063 | 4/1989 | Yopp et al. | |
| 4,836,578 | 6/1989 | Soltis | |
| 4,965,517 | 10/1990 | Shelton et al. | 324/207.2 X |

FOREIGN PATENT DOCUMENTS

| | | | |
|---|---|---|---|
| 0215454 | 3/1987 | European Pat. Off. | G01D 5/20 |
| 0368687 | 5/1990 | European Pat. Off. | G01D 5/14 |
| 1-09302 | 1/1989 | Japan | 324/207.13 |
| 2056692 | 3/1981 | United Kingdom . | |
| 2156994 | 10/1985 | United Kingdom . | |

OTHER PUBLICATIONS

Csaba Csere, Future Shocks, A head-to-head comparison of active and passive Infiniti Q45s., Car and Driver, Nov. 1991, pp. 171–175.

*Primary Examiner*—Gerard R. Strecker
*Assistant Examiner*—Warren S. Edmonds
*Attorney, Agent, or Firm*—Laurie E. Gathman; David Schreiber

[57] ABSTRACT

A magnetic position sensor system including a magnetic medium divided into a plurality of areas of magnetization for producing a magnetic field with a variable intensity. The magnetic medium includes a first side, a second side and a longitudinal axis. A Hall cell is used for detecting the intensity of the magnetic field produced by the magnetic medium and for producing an electric signal which corresponds to the intensity detected. The magnetic medium is movable with respect to the Hall cell so that the Hall cell scans along the first side of the medium along the longitudinal axis and detects the intensity of the magnetic field at any given point along the longitudinal axis of the medium.

11 Claims, 8 Drawing Sheets

POSITION DETECTING APPARATUS USING VARIABLE MAGNETIC FIELD INTENSITY

This is a continuation of application Ser. No. 07/842,829, filed Feb. 27, 1992 now abandoned.

BACKGROUND OF THE INVENTION

This invention is in the field of position sensors, and specifically relates to magnetic position sensors for use with automotive suspension systems.

Position sensors of all types are commonly known in the art, especially in the automotive and industrial environments. Position sensors determine the location of a movable part with respect to a reference. Such sensors range from complex electrical devices to simple mechanical devices. The prior art includes position sensing devices adapted for many different applications as well as position sensors specifically adapted for automotive suspension systems. Adjustable suspension systems typically utilize one or more sensors for detecting the position of one or more parts of the suspension system with respect to either another part of the suspension system or another part of the chassis of the vehicle.

There are many problems with the sensors available today. Sensors which provide only discrete signals can resolve a desired position into only a relatively small number of possibilities. Analog position sensing devices usually have a relatively short stroke or measuring distance.

A position sensing device using a magnetic sensor is disclosed in European Patent No. 0215454. The device of European Patent No. 0215454 has a relatively long stroke or measuring range, but the device is inadequate for use as a position sensing device in today's automotive suspension systems. The device consists of a closed magnetic circuit including at least one permanent magnet or electro-magnet, a yoke and a magnetic sensor. The sensor moves along an inside surface of the yoke and senses a magnetic field intensity of leakage flux emanating from the inside surface of the yoke. The sensor being transferred along the yoke surface makes the sensor vulnerable to a bumpy and harsh environment of an automobile. Furthermore, the design is too expensive and complex for use in an automotive suspension system that would use up to three or four sensors in one suspension system.

Another position sensor that measures magnetic field intensities is a device disclosed in European Patent No. 0368687A2. The device disclosed in European Patent No. 0368687A2 includes a magnetic tape which produces a magnetic field that varies sinusoidally along a longitudinal axis of the tape. The device includes a cursor acting as a pick up head and comprising two identical detectors each including a magnetic core shaped as a half torus and a magnetic flux to voltage transducer. The position of the cursor is a function of the distance between the two transducers and the magnetic field intensity detected. The use of two transducers and two magnetic cores each shaped as a half torus makes the device cumbersome and impractical in an automotive suspension system environment.

Today's automotive components are focusing on active and semiactive suspension systems that are safe, reliable and provide smooth transitions responsive to rough driving conditions and roads. One of the first attempts at such powerful suspension systems include complicated sensors that are expensive and require a significant amount of extra horsepower drained from the automobile's engine system. Such suspension systems add additional weight and intricate electronics to existing suspension systems. The systems are not practical for most car models especially the lower cost models.

Simple, low cost sensors that are being produced today are typically digital sensors. The digital devices simply gives a discrete high, medium and low signal, or a small number of discrete possible states, and the suspension system adjusts accordingly. Unfortunately, since the signal is simply a high or low signal or a discrete state, the signal is not representative of how far off the error is from an equilibrium position. There is the constant problem of over correcting or under correcting and a number of corrections will have to be made before equilibrium is found.

Thus, there is a need in the market for a simple, low cost position sensor that can be adapted for the automotive environment especially to provide suspension position information and other types of information for adjustable suspension systems.

SUMMARY OF THE INVENTION

A principal object of the invention is a simple, low cost position sensor that can be adapted for an automotive suspension system environment.

Another object of the present invention is a magnetic position sensor that provides a linear output over a relatively long stroke.

Another object of the present invention is a position sensor that provides instantaneous error correction and thus smooth response period.

These and other objects are achieved by the present invention which includes, a position sensor system comprising magnetic medium divided into a plurality of areas of magnetization for producing a magnetic field with a variable intensity along a longitudinal axis of the magnetic medium. The magnetic medium is movable with respect to a sensing device which scans along the longitudinal axis of the magnetic medium in order to detect the intensity of the magnetic field produced by the magnetic medium. The sensing device produces an electric signal which corresponds to the magnetic field intensity detected at any given point along the longitudinal axis. The intensity of the magnetic field along the longitudinal axis of the magnetic medium varies monotonically, that is, it varies in one direction.

The areas of magnetization are arranged so that the magnetic field detected by the sensor along a longitudinal axis of the magnetic medium is linear. Thus, the present invention provides a linear output over a relatively long stroke.

A linear output over a long stroke allows for instant error correction and position alliance. Thus, the present invention allows for instant computation of how much compensation is needed and in what direction in order to correct and arrive at an equilibrium position.

The present invention is particularly suitable for an automotive suspension system. An automotive suspension sensor system for a vehicle can be constructed with the magnetic position sensor of the present invention. The sensor includes a magnetic medium of predetermined length made up of a plurality of longitudinally extending magnetic strips. The strips have respective geometries which vary with position along the length of the magnetic medium. Adjacent magnetic strips have opposite polarities. The magnetic field produced by the magnetic medium is linear along a longitudinal axis of the magnetic medium. The sensor further includes a Hall cell as the sensing device for producing an electrical signal representative of a magnetic field intensity produced by the magnetic medium at any given point along the longitudinal axis of the magnetic medium. The magnetic medium is movable with respect to the sensing device. Thus, either the magnetic medium or the sensing device actually moves so that the sensing device scans along the longitudinal axis of the magnetic medium and detects the variable magnetic intensity produced by the magnetic medium. The signal representing the position of the magnetic medium relative to the magnetic field sensing device along the longitudinal axis of the magnetic medium is linear.

Flux guides are placed in close proximity to the Hall cell to guide the flux of the magnetic field through the Hall cell. An iron back up piece is located behind the magnetic medium in order to enhance the magnetic field. The sensor system is connected at one end to a stationary member of the suspension system and at another end to a movable part of the suspension system. The sensor is also connected to a central processing unit for calculations and error correction.

The magnetic sensor of the present invention is simple and inexpensive to produce. It is adaptable for automotive suspension systems of most car models, especially inexpensive models.

The present invention allows for smooth transitions for reactions to bumps and manuvering of a vehicle for most road and traffic conditions.

The sensor according to the present invention is useful in providing suspension position information and ride height information for vehicle leveling systems or adjustable suspension systems.

Other objects, features and advantages of the invention will become apparent from the following detailed description, appended claims and accompanying drawing.

BRIEF DESCRIPTION OF THE DRAWING

The invention will now be described in detail with respect to several preferred embodiments with reference to the accompanying drawing, wherein.

DESCRIPTION OF THE PREFERRED EMBODIMENTS

Figure 1:
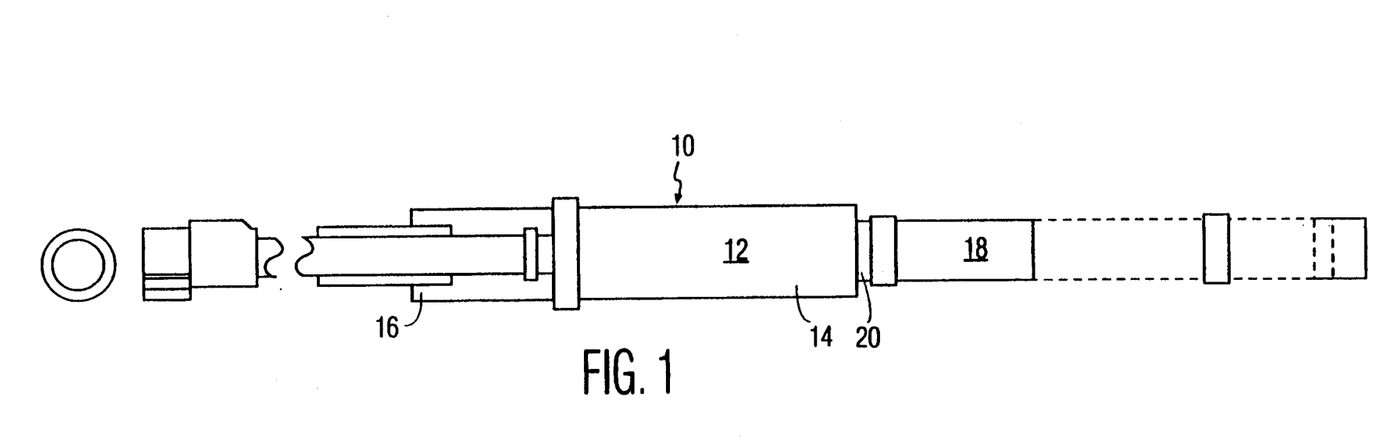
FIG. 1 is a plan view of a housing for a vehicle sensor system in accordance with the invention.

FIG. 1 shows a top view of a housing of a sensor system 10 in accordance with the present invention. The housing includes a stationary part 12 and a telescopically movable part 18. The telescopically movable part 18 is located in a first end 14 of the stationary part and is extendable as shown by the dotted lines of FIG. 1.

Figure 2:
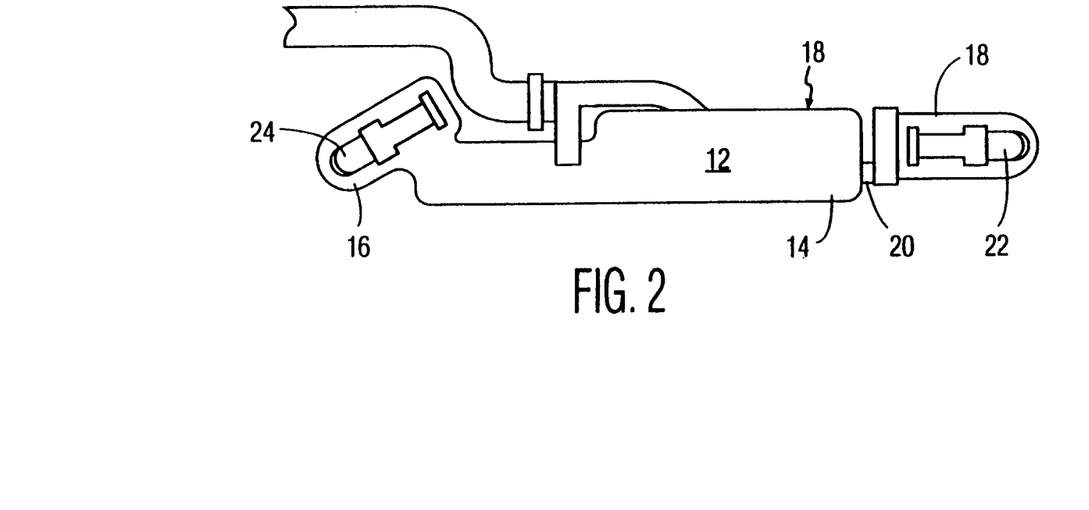
FIG. 2 is a side view of the housing of the sensor system of FIG. 1.

FIG. 2 shows a side view of the housing of FIG. 1. One end of the movable part 18 has a connection portion 22 for connection to a movable part of a suspension system (not shown). One end 16 of the stationary part 12, shown opposite to the first end 14, has a connection portion 24 for connection to a stationary part of the suspension system. The positioning of the connection means in regard to the sensor system 10 and the suspension system can vary as long as the movable part 18 of the sensor system is connected to a movable part of the suspension system and the stationary part 12 of the sensor system is connected to a stationary part of the suspension system.

Figure 3:
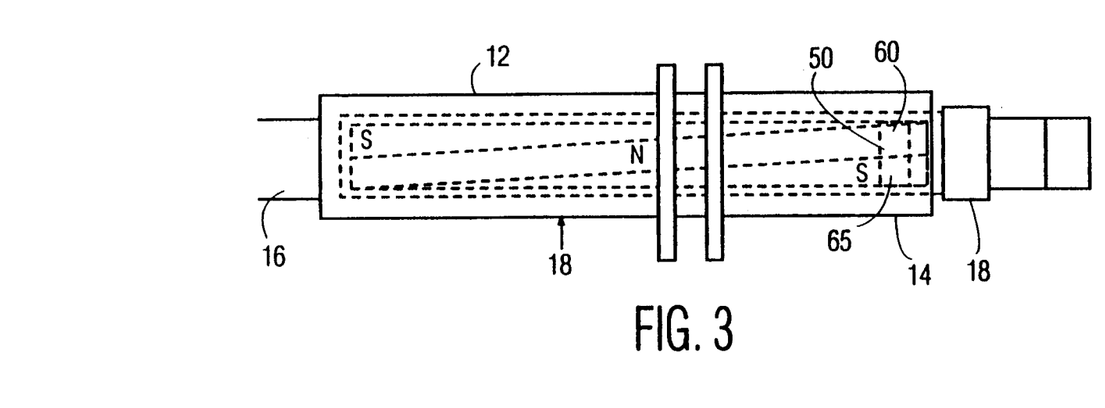
FIG. 3 is a plan view of the system shown in FIG. 1 with a movable part retracted within a stationary part shown in phantom.
Figure 4:
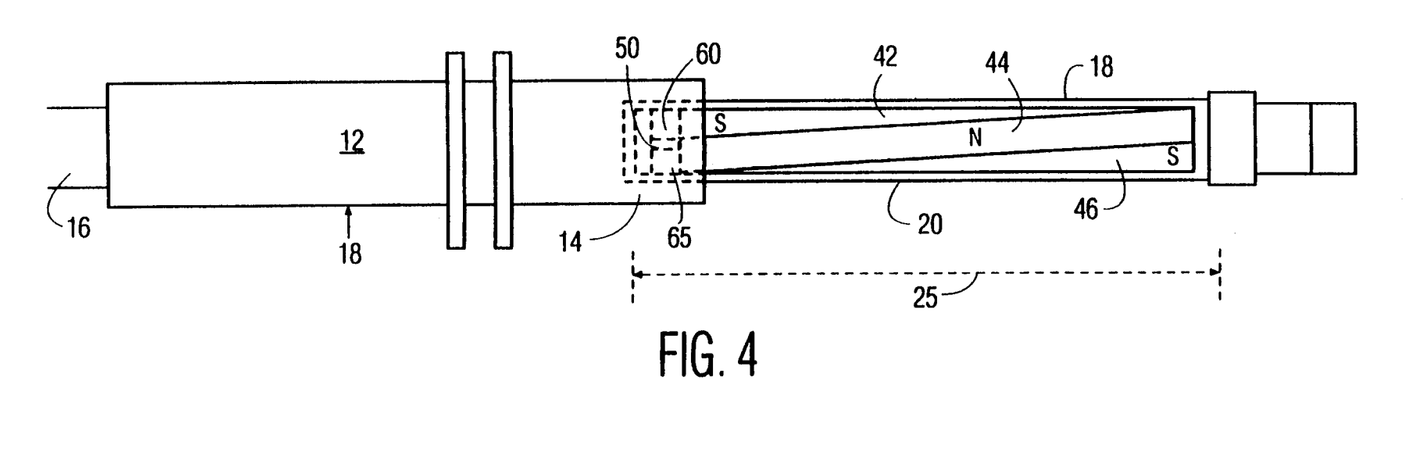
FIG. 4 is a plan view of the sensor system of FIG. 1 with the movable part extended.

A magnetic medium 20 is located on the movable part 18 as shown in FIG. 4 and by dotted lines in FIG. 3. The magnetic medium 20 can be a plastic bonded magnet adaptable for automotive applications. FIG. 3 shows the magnetic medium 20 and most of the movable part 18 retracted within the stationary part 12 of the housing and FIG. 4 shows the magnetic medium 20 and most of the movable part 18 extended outside of the housing. The movable part 18, with the magnetic medium 20, telescopically retracts in and extends out of the stationary part 12 of the housing.

A sensing device 50 is located within the first end 14 of the stationary part 12 so that the magnetic medium 20 is scanned by the sensing device 50 as it travels in and out of the stationary part 12. The sensing device 50 is a linear Hall cell but can be any other suitable type of magnetic flux to voltage transducer component. The Hall cell 50 can be of a known type which provides a change in voltage output which varies in magnitude in accordance with variations of magnetic field strength or magnetic flux detected by the Hall cell 50.

On two sides of the Hall cell 50 are flux guides 60, 65 to concentrate and guide the magnetic flux through the Hall cell 50. The flux guides 60, 65 are made of a ferrous material.

FIGS. 3 and 4 show the magnetic medium 20 divided into a plurality of areas of magnetization. Specifically, three areas of magnetization of particular geometric shapes form a magnetic field intensity that varies linearly along a longitudinal axis 25. The areas of magnetization may be different than the geometries and polarities shown in FIGS. 3 and 4 as long as the magnetic field intensity varies so that positions are measurable over a relatively long stroke. A first area 42 of magnetization and a third area 46 of magnetization are south poles with triangular shaped geometrics disposed oppositely to one another. Between the two south poles 42, 46 is an offset rectangular shaped north pole area 44. Alternatively, the pole areas could be arranged in any way in which a linearly output could be detected.

Figure 5:
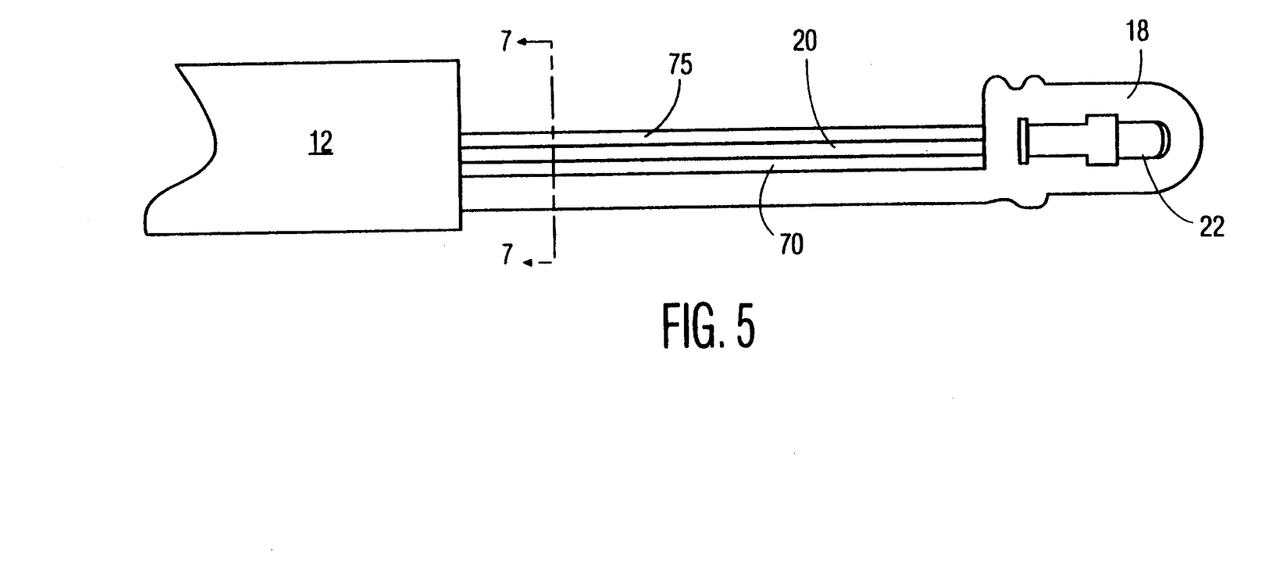
FIG. 5 is a cross-sectional side view of the movable part of the sensor system of FIG. 1.

FIG. 5 shows a cross-sectional view of the movable part 18 of the sensor system 10. A thin sheet of plastic material 75 is attached on top of the magnetic medium 20 as a protective coating. Alternatively, a magnet assembly could be injection molded into the movable part 18 using the same polymer as the movable part 18. An iron sheet 70 or other ferrous material is attached behind the magnetic medium 20 so that a concentrated magnetic return path is created.

Figure 6:
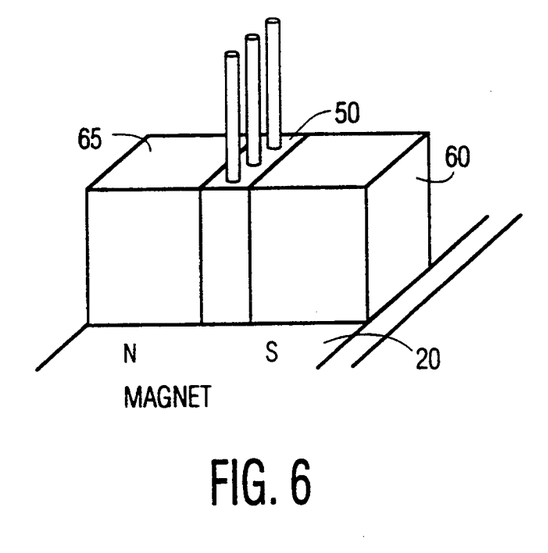
FIG. 6 is a perspective view of the Hall cell between the flux guides as arranged within the housing of the system of FIG. 1.
Figure 7A:
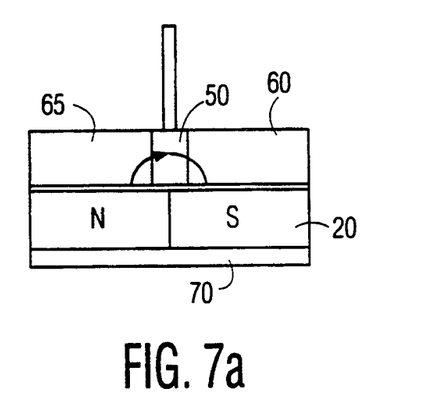
FIGS. 7a–7c are cross-sectional front views taken across the line 7—7 of FIG. 5 for different magnetic field intensities.
Figure 7B:
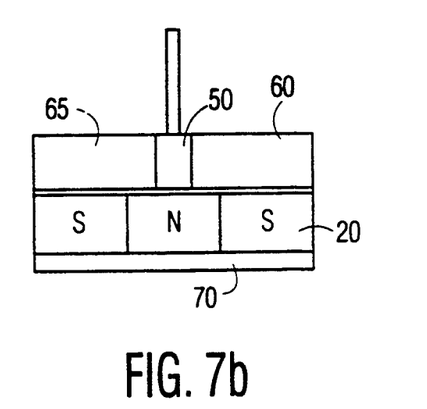
Figure 7C:
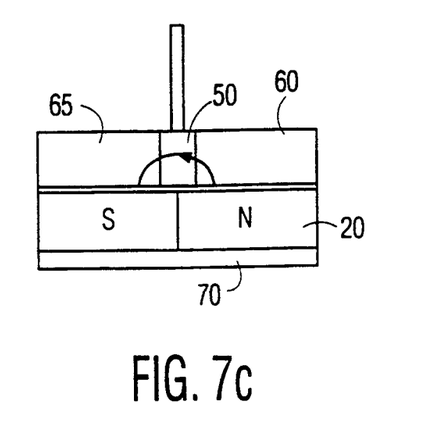

FIG. 6 shows the Hall cell 50 arranged between two flux guides 65, 60. As the magnetic medium 20 is moved in and out of the stationary part 12 the magnetic field and flux around the Hall cell 50 varies. When the magnetic medium 20 is all the way extended the magnetic flux is as shown in FIG. 7a. When the magnetic medium 20 is pushed half way into the stationary part 12 the magnetic flux at the Hall cell 50 cancels itself and there is no net magnetic flux through the Hall cell 50 as shown by FIG. 7b. When the magnetic medium 20 is pushed all the way into the stationary part 12 the magnetic flux is as shown in FIG. 7c, which is the reverse of FIG. 7a. The Hall cell 50 provides an output signal which varies in magnitude in accordance with various magnetic fields or magnetic flux detected.

Figure 8A:
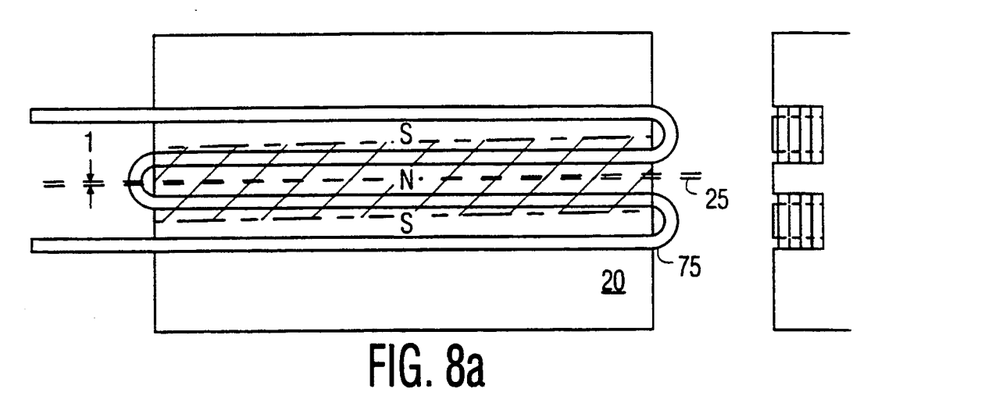
FIGS. 8a–8c are plan views of a magnetizing fixture at different angles in accordance with the invention.
Figure 8B:
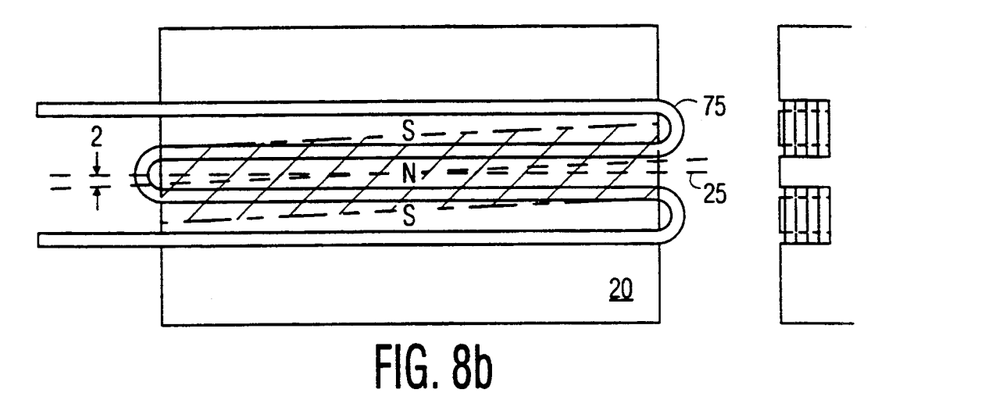
Figure 8C:
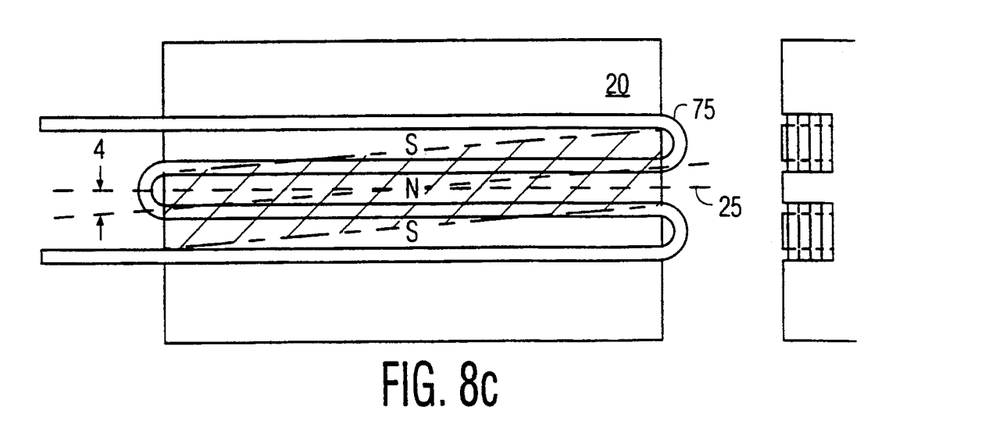

The magnetic field intensity varies linearly along the longitudinal axis 25 because of the plurality of areas of magnetization arranged to have a linear output for a relatively long stroke. The area of magnetization can be polarized as shown in FIGS. 8a-8c. A magnetizing fixture 75 is placed over the magnetic medium 20 at particular angles in order to create the desired pattern of magnetic areas. The magnetic fixture 75 is placed at an angle of 1 degree from the longitudinal axis 25 as shown in FIG. 8a, at 2 degrees in FIG. 8b, and at 4 degrees in FIG. 8c. The larger the angle with respect to the longitudinal axis 25, the steeper the slope of the linear output. Alternatively, the magnetizing fixture could be modified for functions other than linear, i.e., sine, cosine, exponential, etc.

Figure 9:
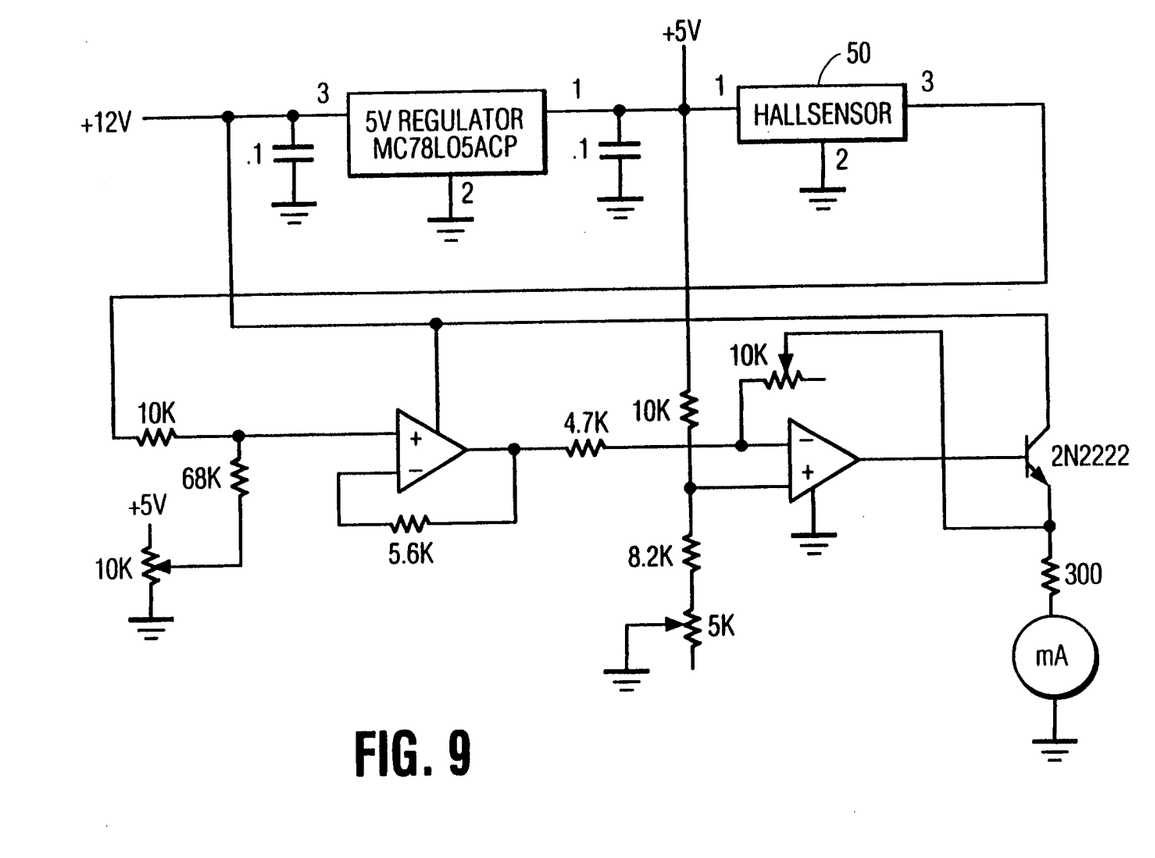
FIG. 9 is a circuit diagram for the sensor system of FIG. 1.

FIG. 9 shows a circuit diagram for the sensor system 10 of the present invention. A constant 5 volts is supplied the Hall cell 50 by a 5 volt line regulator. The Hall cell 50 outputs a control signal based upon the magnetic field across the Hall cell 50. The control signal is amplified and a power control signal is created to drive a 300 ohm load.

Figure 10:
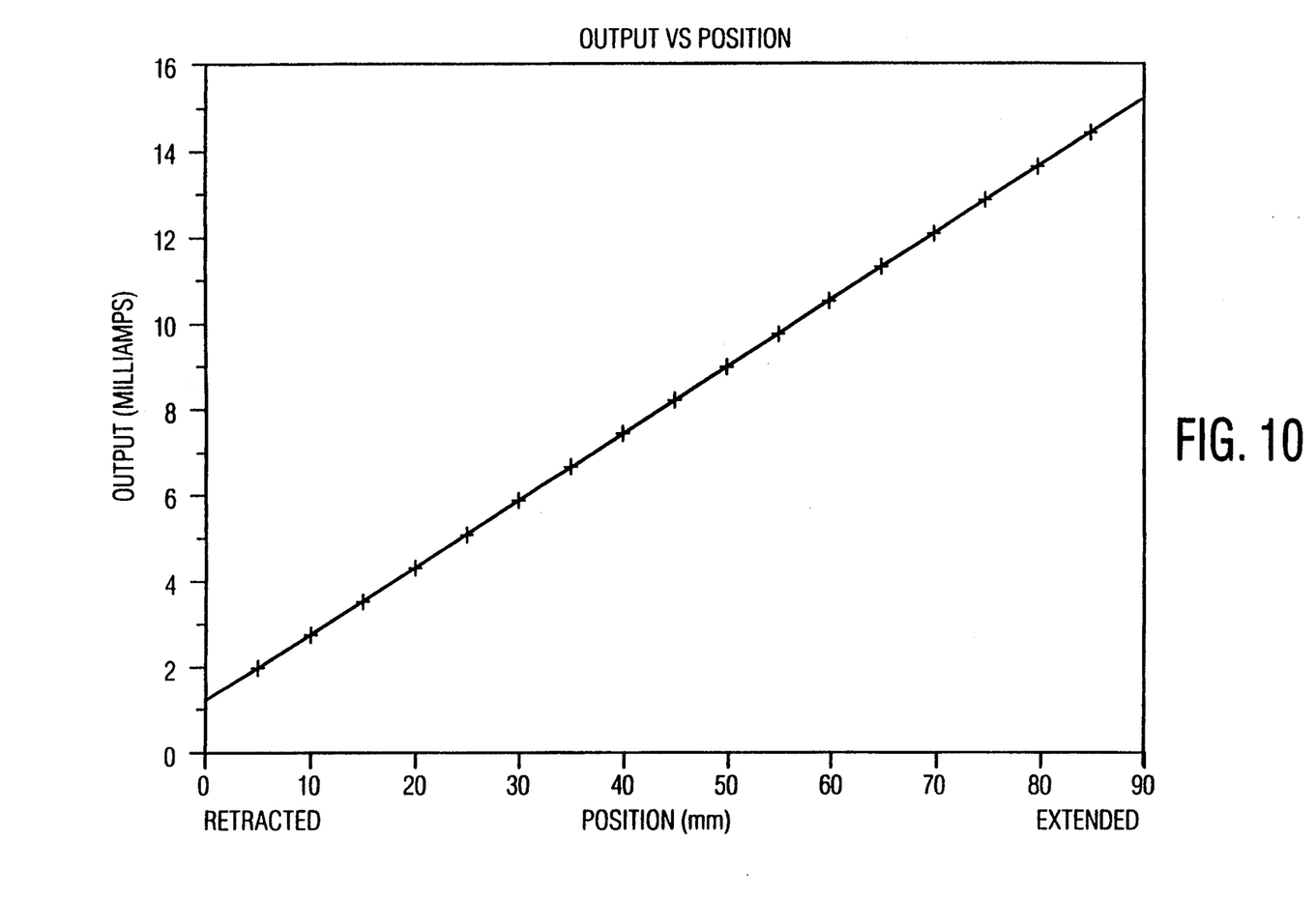
FIG. 10 is a chart that shows the linear output of the circuit diagram of FIG. 9 for the present invention.

FIG. 10 shows the output from the circuit of FIG. 9. The x-axis shows the position of the Hall cell with respect to the longitudinal axis in mm and the y-axis shows the corresponding output in milliamps.

While the invention has been described and illustrated in connection with preferred embodiments, many variations and modifications as will be evident to those skilled in this art may be made therein without departing from the spirit of the invention, and the invention as set forth in the appended claims is thus not to be limited to the precise details of construction set forth above as such variations and modifications are intended to be included within the scope of the appended claims.

We claim:

1. A position sensor system, comprising:
 a magnetic medium having a top surface and a longitudinal axis divided into a first area of magnetization having a first polarity, a second are of magnetization having a second polarity and a third area of magnetization having the first polarity for producing a magnetic field with a variable intensity;
 means for detecting the intensity of the magnetic field produced by the magnetic medium;
 means for producing an electric signal which corresponds to the intensity detected; and
 means for moving the magnetic medium with respect to the detecting means so that the detecting means scans along the top surface of the medium along the longitudinal axis and detects the intensity of the magnetic field at any given point along the longitudinal axis of the medium, the medium having a monotonically varying magnetic field intensity along the longitudinal axis.

2. The sensor system of claim 1, wherein the variable intensity of the magnetic field along the longitudinal axis of the magnetic medium is linear.

3. The sensor system of claim 1, wherein the means for detecting the intensity of the magnetic field produced by the magnetic medium and means for producing an electrical signal which corresponds to the intensity comprises a Hall cell.

4. The sensor system of claim 3, further comprising flux guide placed in close proximity to the Hall cell for guiding magnetic flux of the magnetic field through the Hall cell.

5. The sensor system of claim 1, wherein the magnetic medium a plastic bonded magnet.

6. The sensor system of claim 1, further comprising an iron backup piece extending along a side of the magnetic medium opposite the top side for creating a magnet return path.

7. The sensor system of claim 1, further comprising a connector connected to the electric signal producing means for feeding an output of the system to a CPU.

8. An automotive suspension sensor system for a vehicle, said system comprising:
 a stationary part having a first end and a second end;
 a telescopically movable part having a longitudinal axis connected at the first end of the stationary part;
 a magnet located within the moveable part, the magnet having at least three longitudinally extending magnetic strips having respective geometries which vary with position along said length, adjacent ones of said strips having opposite polarities, the magnet having a monotonically varying magnetic field intensity along the longitudinal axis;
 a linear Hall cell disposed at the first end of the stationary part for outputting a current dependent upon a variable magnetic field produced by the magnet; and
 flux guides placed in close proximity to the Hall to guide the field through the Hall cell.

9. The sensor system of claim 8, wherein the magnetic field varies linearly along a longitudinal direction of the magnet.

10. A magnetic position sensor comprising:
 a. a magnetic field sensing means for producing an electrical signal representative of a magnetic field intensity sensed thereby;
 b. a magnetic medium of predetermined length having at least three longitudinally extending magnetic strips having respective geometries which vary with position along said length, adjacent ones of said magnetic strips having opposite polarities, the magnetic medium having a monotonically varying magnetic field intensity along the longitudinal axis; and
 c. means for moving the magnetic medium in a longitudinal direction relative to the magnetic field sensing means such that said signal representing the position of the magnetic medium relative to the magnetic field sensing means is linear.

11. A position sensor system comprising:

a magnetic medium divided into a first area of magnetization having a first polarity, a second area of magnetization having a second polarity and a third area of magnetization having said first polarity for producing a magnetic field with a variable intensity, the magnetic medium having a top surface and a longitudinal axis;

means for detecting the intensity of the magnetic field produced by the magnetic medium;

means for producing an electric signal which corresponds to the intensity detected;

means for moving the magnetic medium with respect to the detecting means so that the detecting means scans along the top surface of the medium along the longitudinal axis and detects the intensity of the magnetic field at any given point along the longitudinal axis of the medium, each point along the longitudinal axis having a distinct magnetic field intensity.

* * * * *